United States Patent [19]

Onozawa

[11] Patent Number: 4,928,131
[45] Date of Patent: May 22, 1990

[54] SEA CLUTTER SUPPRESSION RADAR

[75] Inventor: Kazuo Onozawa, Tokyo, Japan

[73] Assignee: Oki Electric Industry Co., Tokyo, Japan

[21] Appl. No.: 241,236

[22] Filed: Sep. 7, 1988

[30] Foreign Application Priority Data

Sep. 17, 1987 [JP] Japan .................. 62-232965

[51] Int. Cl.⁵ .......................................... G01S 13/50
[52] U.S. Cl. ................................. 342/188; 342/159
[58] Field of Search ............................. 342/188, 159

[56] References Cited

U.S. PATENT DOCUMENTS

| | | | |
|---|---|---|---|
| H205 | 2/1987 | Green et al. | 342/134 |
| 3,755,810 | 8/1973 | Latham, IV et al. | 342/181 |
| 3,893,117 | 7/1975 | Nirasawa et al. | 342/159 |
| 3,918,055 | 11/1975 | Shimuzu et al. | 342/159 |
| 3,952,305 | 4/1976 | Nirasawa et al. | 342/159 |
| 3,955,196 | 5/1976 | Nirasawa et al. | 342/159 |
| 4,008,472 | 2/1977 | Nirasawa et al. | 342/159 X |
| 4,053,882 | 10/1977 | Van Etten | 342/188 |
| 4,231,037 | 10/1980 | Long | 342/188 X |
| 4,242,682 | 12/1980 | Musha et al. | 342/162 X |
| 4,357,607 | 11/1982 | Van der Heijden et al. | 342/197 |
| 4,706,031 | 11/1987 | Michiguchi et al. | 324/337 |
| 4,737,788 | 4/1988 | Kennedy | 342/29 |
| 4,766,435 | 8/1988 | Wells | 342/82 |

OTHER PUBLICATIONS

"Studies Concerning the Improvement of the Signal-to-Clutter Ratio of Radar-Detected Ship Targets", by Specker, 1985, XI$^{th}$ Conference of International Association of Lighthouse Authorities.

Primary Examiner—Thomas H. Tarcza
Assistant Examiner—John B. Sotomayor

[57] ABSTRACT

A sea clutter suppression radar is capable of effectively suppressing the reflected signal using RF waves of a single frequency by simultaneously sending the RF waves each having horizontal and vertical polarizations, and detecting, from a reflected signal from a target, horizontally and vertically polarized components and the vector sum and the vector difference signals between these components, and then processing these signals to suppress the reflected signal from the sea surface. The radar includes at least one antenna for simultaneously sending horizontally and vertically polarized RF waves, first and second detectors each for detecting intermediate frequency signals or horizontally and vertically polarized components of reflected RF waves, third and fourth detectors each for detecting IF signals of the vector sum and vector difference between the horizontally and vertically polarized components and a polar signal generator for generating a polar signal based upon the difference between the addition of both outputs of the first and second detectors, and the absolute value of the difference between said both outputs and the difference between the outputs of the third and fourth detectors.

4 Claims, 10 Drawing Sheets (a) AMPLITUDE RATIO (b) PHASE DIFFERENCE (c) OUTPUT FROM ADDER 37

(d) OUTPUT FROM MEAN LEVEL ELIMINATION CIRCUIT 43

(e) OUTPUT FROM POLARITY CONVERSION CIRCUIT 39

Fig. 8
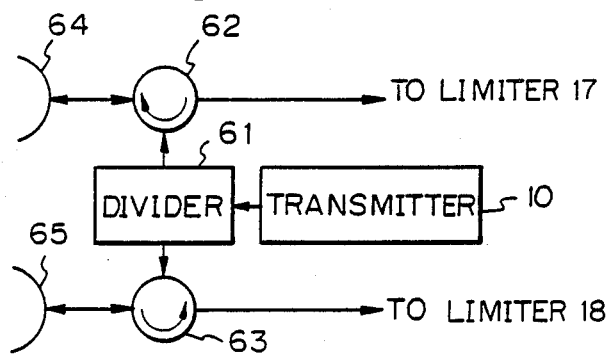
Fig. 9
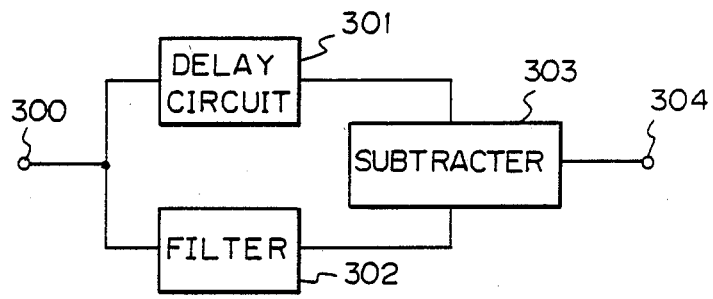
Fig. 10
|   | a | b | c | d | e |
|---|---|---|---|---|---|
| ① | 0 | 0 | 0 | 0 | 1 |
| ② | 0 | 0 | 0 | 1 | 0 |
| ③ | 0 | 0 | 1 | 1 | 1 |
| ④ | 0 | 1 | 1 | 1 | 0 |
| ⑤ | 1 | 1 | 1 | 1 | 1 |

SEA CLUTTER SUPPRESSION RADAR

BACKGROUND OF THE INVENTION

1. Field of the Invention:

The present invention relates to sea clutter suppression radar.

2. Description of the Prior Art:

Conventionally, a prior art technique is known as a prior one is disclosed in "STUDIES CONCERNING THE IMPROVEMENT OF THE SIGNAL-TO-CLUTTER RATIO OF RADAR-DETECTED SHIP TARGETS" by Specker, 1985, XI$^{th}$ CONFERENCE OF INTERNATIONAL ASSOCIATION OF LIGHTHOUSE AUTHORITIES.

It is often experienced, when a radar senses any target on the sea, that the radar may receive not only a true signal reflected from the target but also a false signal reflected from waves on the sea and thus be hindered from sensing the target. There are various known techniques to suppress such a reflected signal from waves on the sea, among which a technique to correlate those signals is widely known to be effective. The correlation method is to correlate a target signal with a reflected signal from the sea surface by making use of addition and multiplication or a combination thereof, etc., when those signals are varied temporarily or owing to a change in the characterisitcs of the associated radar waves. However, signals reflected from the sea surface are changed slowly in time compared with the period of a pulse from a radar. The method to take the correlation between signals shifted in time to each other or between signals changed in their planes of polarization to each other or the method in combination thereof is accordingly incapable of affording sufficient effects. To solve this, a technique was developed to take the correlation by varying the frequency of the radar waves. That is, the technique is adapted to take multiple correlation among four signals: two orthogonal polarized waves and two frequencies as disclosed in the aforementioned reference.

However, such a technique to use a plurality of frequencies suffers from a problem that it must occupy many frequencies having public character so that the associated radar equipment is complicated and costly.

SUMMARY OF THE INVENTION

In view of the drawbacks of the prior art, it is an object of the present invention to provide a sea clutter suppression radar capable of effectively suppressing the reflected signal using RF wave of a single frequency by simultaneously sending the RF wave each having horizontal and vertical polarizations, and detecting, from a reflected signal from a target, horizontally and vertically polarized components and the vector sum of and vector difference signals between these components, and then processing those signals to suppress the reflected signal from the sea surface.

To achieve the above object, the present invention includes: at least one antenna simultaneously sending horizontally and vertically polarized RF waves; first and second detectors each for detecting intermediate frequency (IF) signals of horizontally and vertically polarized components of reflected RF waves; third and fourth detectors each for detecting IF signals of the vector sum of and vector differnce between the horizontally and vertically polarized components; and a polar signal generator for genarating a polar signal based upon the difference between the addition of both outputs of the first and second detectors, and the absolute value of the difference between said both outputs the difference between the outputs of the third and fourth detectors.

Additionally, the present invention includes a mean fraction removal circuit for removing a mean fraction (i.e.—the average DC value or DC component) from an addition output of outputs from the third and fourth detectors after they are respectively subtracted from an output as the result of the absolute value conversion; and a polarity converter for converting the polarity of an output from the mean fraction removal circuit in conformity with an output from the polar signal generator.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 2(a)-2(b) are views illustrating the characteristics of y and z derived from an expression described later wherein FIG. 2(a) shows a relationship between y and $|r|$, taking the ratio of amplitudes as a parameter, and FIG. 2(b) shows a relationship between z and $|\lambda|$ taking the same ratio of amplitudes;

FIG. 8 is a block diagram illustrating another further embodiment of the present invention;

FIG. 9 is a block diagram illustrating the arrangement of a mean level elimination circuit 43 of FIG. 1; and FIG. 10 is a truth table listing an output e of an OR circuit 120 with respect to output signals a, b, c and d of comparators 108, 109, 110, and 111 of FIG. 3.

DESCRIPTION OF THE PREFERRED EMBODIMENT

Figure 1A:
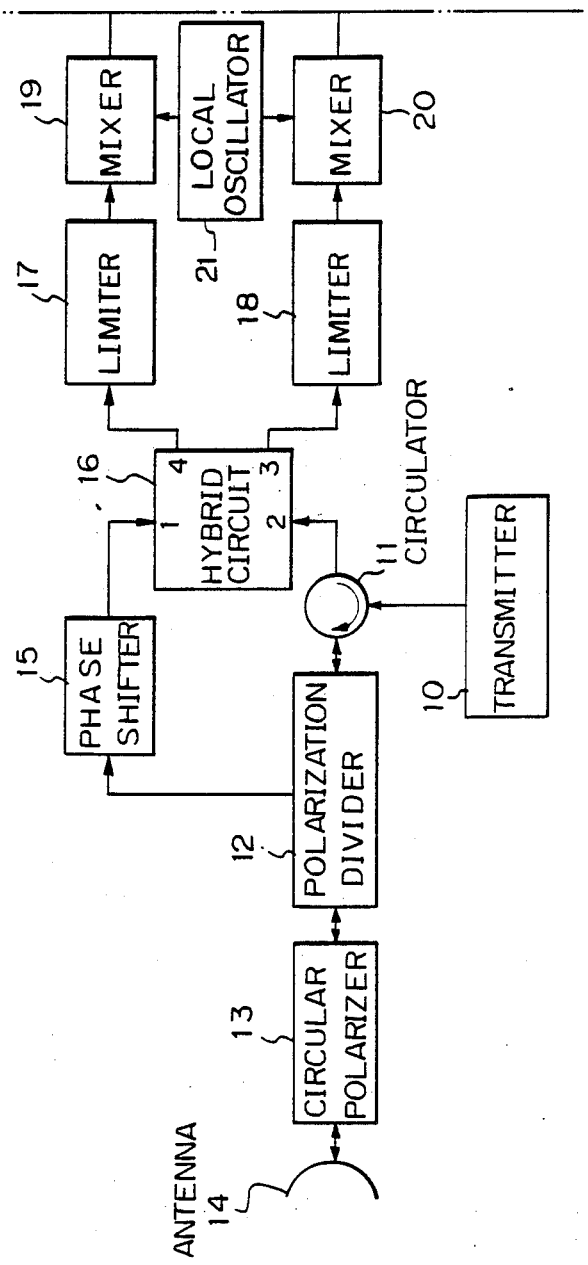
FIG. 1 consisting of FIGS. 1(a)-1(c), is a block diagram illustrating the arrangement of an embodiment of a sea clutter suppression radar according to the present invention.
Figure 1B:
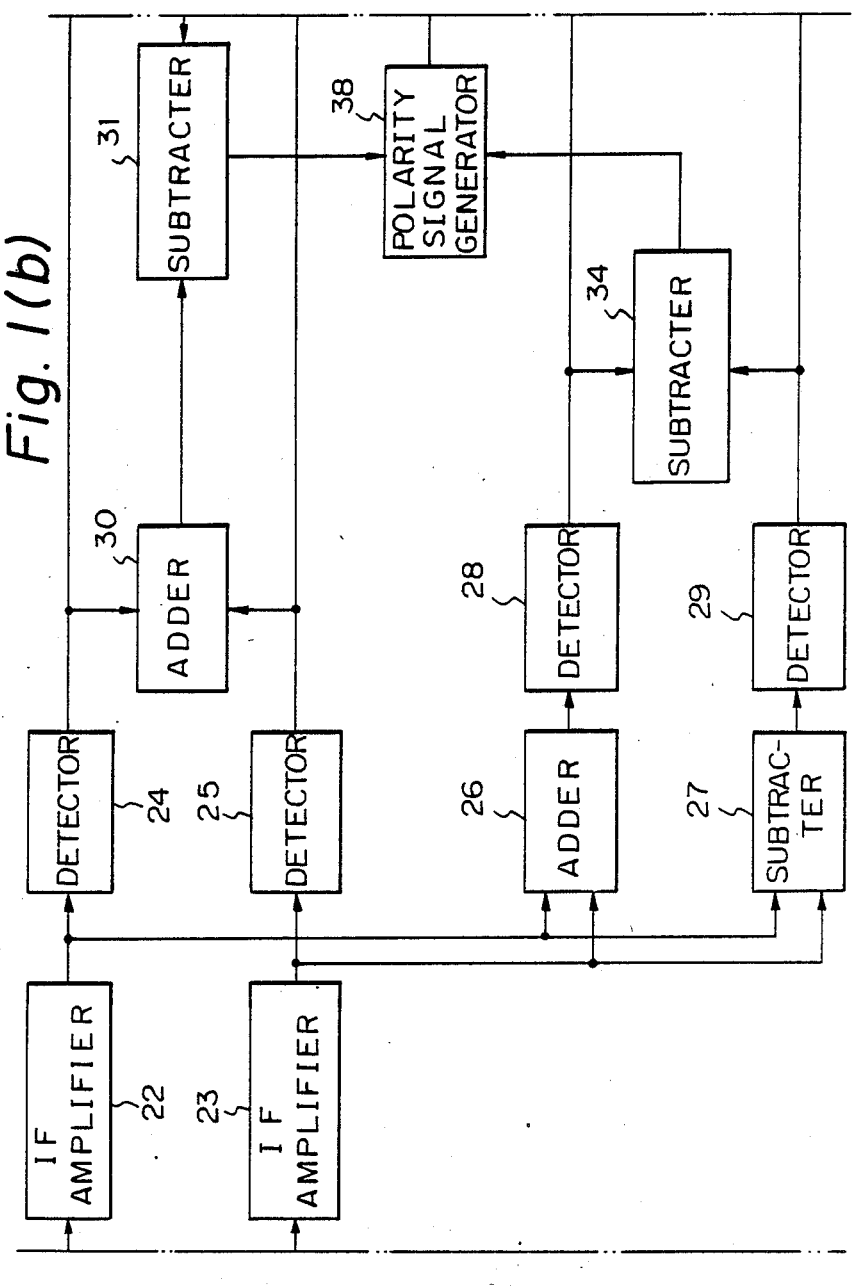
Figure 1C:
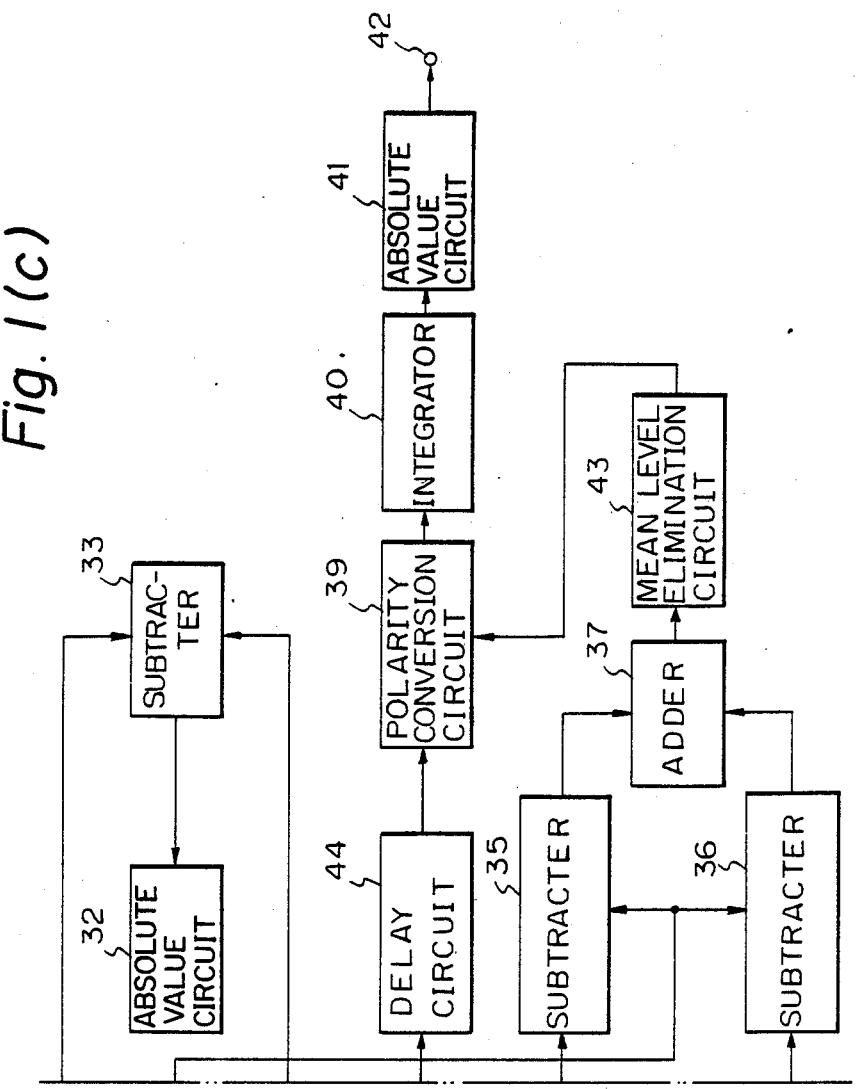

FIGS. 1(a)-1(c) together form a block diagram illustrating the arrangement of an embodiment of a sea clutter suppression radar according to the present invention. In the figure, element 10 is a transmitter for sending pulsed RF waves of a single frequency; element 11 is a circulator for transmitting the pulsed RF waves in the direction of the illustrated arrow; element 12 is a polarization divider; element 13 is a circular polarizer for generating circularly polarized waves of a quarter-wave type including a dielectic plate mounted thereon, which is slanted 45° left upwardly when viewed from the direction of propagation of the sent RF waves;

element 14 is an antenna; element 15 is a phase shifter; element 16 is a hybrid circuit for delivering to terminals 4 and 3 the vector sum of and the vector difference between the input signals at terminals 1 and 2; element 17 and 18 are limiters; element 19 and 20 are mixers; element 21 is a local oscillator; element 22 and 23 are intermediate frequency (IF) amplifiers; elements 24, 25, 28, and 29 are detectors for effecting envelope detection of the IF signals; element 26 is an adder for performing addition of the IF signals; element 27 is a subtractor for performing subtraction between the IF signals; elements 30 and 37 are adders each for performing addition of video signals; elements 31, 33, 34, 35, and 36 are subtractors each performing for subtraction of video signals from each other; element 32 is an absolute value circuit for converting a bipolar input signal to a unipolar signal; element 38 is a polarity signal generator for receiving outputs from the subtractors 31 and 34 to generate a binary signal based upon a voltage relationship between the two outputs; element 44 is a delay circuit for delaying the binary signal generated by the polarity signal generator 38; element 43 is a mean level elimination circuit for time-integrating an output signal from the adder 37 through its filter and subtracting the resulting signal from the above output signal to remove the mean fraction (i.e.—the average DC value of the above output; element 39 is a polarity conversion circuit for receiving an output signal from the mean level elimination circuit 43 and the binary signal from the delay circuit 44 to either convert or leave unchanged the polarity of the output signal from the mean level elimination circuit in accordance with the value of the binary signal; element 40 is an integrator with the number of additions being n for receiving an output from the polarity conversion circuit 39 to store the same over n pulse repetition periods thereof and to add in succession the same and n signals of the same propagation distance as that of the present signal; element 41 is an absolute value circuit for converting a bipolar signal delivered from the integrater 40 to a unipolar signal, and element 42 is the output terminal for a video signal.

In succession, the operation of the embodiment will be described.

The transmitter 10 generates pulsed RF waves which are in turn sent, after passing through the circulator 11, to the polarization divider 12 as horizontally polarized radiowaves having a horizontal electric field component. The RF waves pass through the polarization divider 12 as they are and are sent to the circular polarizer 13 for generating circularly polarized waves as a horizontally polarized wave, whereby they are converted to a right-handed circularly polarized wave and radiated to the outside through the antenna 14. The reflected wave from a target, elliptically polarized in general, is received by the antenna 14 and sent to the circular polarizer 13 for generating circularly polarized waves. Now expressed amplitudes and phases of horizontally and vertically polarized components of the received RF waves are as $E_H$, $E_V$, and $\phi_H$, $\phi_V$, both polarized components produce a phase difference of 90° between electric field components thereof perpendicular and parallel to a dielectric plate disposed in the circular polarizer 13 for generating circularly polarized waves after propagation of the dielectic plate. Thereupon, horizontally and vertically polarized components $\dot{F}_H$ and $\dot{F}_V$ of the radiowaves received by the polarizer 14 are expressed respectively by:

$$\dot{F}_H = 1/\sqrt{2}\ \{1/\sqrt{2}\ E_H e^{j\phi H} + 1/\sqrt{2}\ E_V e^{j\phi V}\} + 1/\sqrt{2}$$
$$\{1/\sqrt{2}\ E_H e^{j(\phi H - \pi/2)} - 1/\sqrt{2}\ E_V e^{j(\phi V - \pi/2)}\}$$
$$= 1/\sqrt{2}\ e^{-j\pi/4}\ \{E_H e^{j\phi H} + E_V e^{j(\phi V + \pi/2)}\}$$

$$\dot{F}_V = 1/\sqrt{2}\ \{1/\sqrt{2}\ E_H e^{j\phi H} + 1/\sqrt{2}\ E_V e^{j\phi V}\} - 1/\sqrt{2}$$
$$\{1/\sqrt{2}\ E_H e^{j(\phi H - \pi/2)} - 1/\sqrt{2}\ E_V e^{j(\phi V - \pi/2)}\}$$
$$= 1/\sqrt{2}\ e^{j\pi/4}\ \{E_H e^{j\phi H} + E_V e^{j(\phi V + \pi/2)}\}$$

These two polarized components $F_H$ and $F_V$ are sent to the polarization divider 12, through which the horizontally polarized component $F_H$ is transmitted to the same terminal as the input terminal for the received RF waves while the vetically polarized component $F_V$ transmitted to the other terminal. The horizontally polarized wave output from the polarization divider 12 is, after passage through the circulator 11, inputted into the terminal 2 of the hybrid circuit 16, while the vertically polarized wave output from the divider 12, after passage through the phase shifter 15 where it is subjected to a predetermined phase shift, is inputted into the input terminal 1 of the hybrid circuit 16. The predetermined phase shift described above means an additional phase change added by the phase shifter 15 to the vertically polarized wave output and required for the propagation phase difference between the horizontally and vertically polarized waves becoming 90° until these waves reach from the polarization divider 12 to the hybrid circuit 16. The terminals 4 and 3 of the hybrid circuit 16 output the following signals as the vector sum and vector difference between the input signals to the terminals 1 and 2:

$$F_H - F_{Ve} e^{-j\frac{\omega}{2}} = 2e^{-j\frac{\omega}{4}} E_{Ve}^{j(\phi V + \frac{\omega}{2})}$$

$$F_H + F_{Ve} e^{-j\frac{\omega}{2}} = 2e^{-j\frac{\omega}{4}} F_{He}^{j\phi H}$$

These two signals are, after passage through the limiters 17 and 18 respectively, converted to IF signals by the mixers 19 and 20, and, after amplification by the IF amplifiers 22 and 23, outputted as the IF signals. Assuming now that the respective amplitude and phase characteristics of the limiters 17, 18, mixers 19, 20, and IF amplifiers 22, 23 are equal, the outputs from the IF amplifiers 22 and 23 described above are given by signals:

$$E_1 = F_1 e^{j\phi H}$$

$$E_2 = E_2 e^{j(\phi V + \frac{\omega}{2})}$$

Here, $E_1(>0)$ and $E_2(>0)$ respectively express that the amplitudes $E_H$ and $E_V$ of the horizontally and vertically polarized components of the received RF waves of these amplitudes $E_H$ and $E_V$ are changed mainly through the amplitude characteristics of the IF amplifiers 22 and 23. Moreover, common terms of amplitudes and phases to both signals are omitted here. The detectors 24 and 25 output $|\dot{E}_1| = E_1$ and $|\dot{E}_2| = E_2$ respectively, while the detectors 28 and 29 outputting $|\dot{E}_1+\dot{E}_2|$ and $|\dot{E}_1-\dot{E}_2|$ respectively. Since the output from the absolute value circuit 32 provides $|E_1-E_2|$, the amplitude Y of an output from the adder 37 is given by $$Y = |\dot{E}_1 + \dot{E}_2| + |\dot{E}_1 - \dot{E}_2| - 2|E_1 - E_2|$$
$$= \sqrt{E_1^2 + E_2^2 + 2E_1 E_2 \cos(\phi_V - \phi_H + \pi/2)} + \sqrt{E_1^2 + E_2^2 - 2E_1 E_2 \cos(\phi_V - \phi_H + \pi/2)} - 2|E_1 - E_2|$$

The amplitude Z of an output from the subtracter 34 is given by $$Z = |\dot{E}_1 + \dot{E}_2| - |\dot{E}_1 - \dot{E}_2|$$
$$= \sqrt{E_1^2 + E_2^2 + 2E_1 E_2 \cos(\phi_V - \phi_H + \pi/2)} - \sqrt{E_1^2 + E_2^2 - 2E_1 E_2 \cos(\phi_V - \phi_H + \pi/2)}$$

Rewritten here Y and Z with substitution $E_2/E_1 = r$, $\phi_V - \phi_H + \omega/2 = \lambda$, $Y/E_1 = y$, $Z/E_1 = z$, $$y = \sqrt{1 + r^2 + 2r\cos\gamma} + \sqrt{1 + r^2 - 2r\cos\gamma} - 2|1 - r|$$

$$z = \sqrt{1 + r^2 + 2r\cos\gamma} - \sqrt{1 + r^2 - 2r\cos\gamma}$$

Figure 2A:
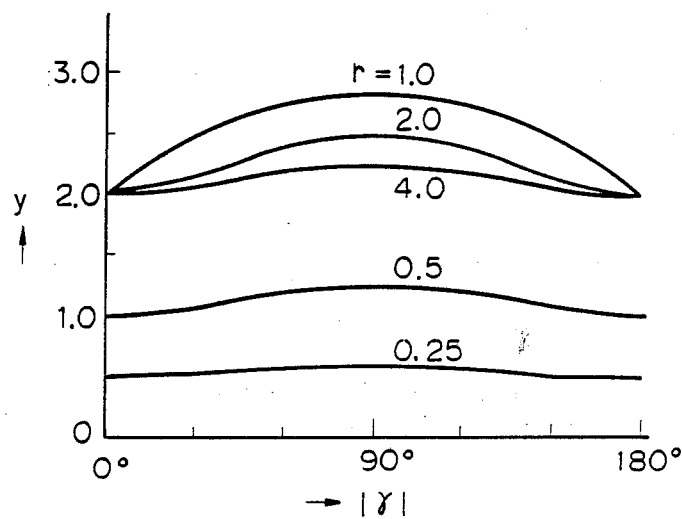
Figure 2B:
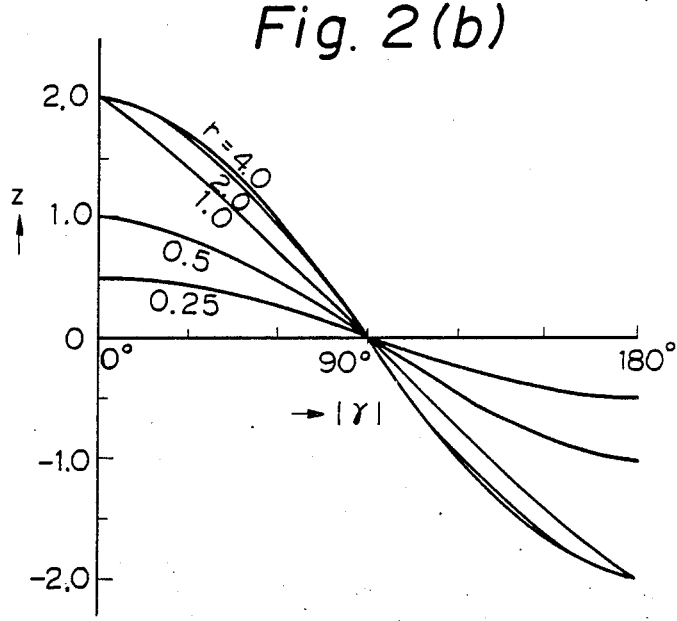

FIGS. 2(a)-2(b) illustrate the characteristics of y and z, wherein FIG. 2(a) shows a relationship between y and $|\lambda|$ taking the amplitude ratio r as a parameter, and FIG. 2(b) shows a relationship between z and $|r|$. As shown in FIG. 2(a), the amplitude Y of the output from the adder 37 has a substantially fixed relationship with respect to a phase difference $\lambda$ associated with the difference between the phases $\phi_H$ and $\phi_V$ of the horizontally and vertically polarized components of the received radiowaves as y changes. Additionally, as shown in FIG. 2(b), the amplitude Z of the output from the subtracter 34 monotonously decreases or increases in the range $0 \leq \lambda \leq 180$ or $-180 \leq \lambda \leq 0$ as Z changes. The subtracter 31 outputs $E_1 + E_2 - |E_1 - E_2|$ therefrom, which is equal to a value $Z(\lambda=0)$ when $\lambda=0$ in the expression of the foregoing amplitude Z. The polarity signal generator 38 compares the value $Z(\lambda=0)$ with the amplitude Z and thereby generates a binary signal which changes in conformity with the phase difference $\lambda$.

Figure 3:
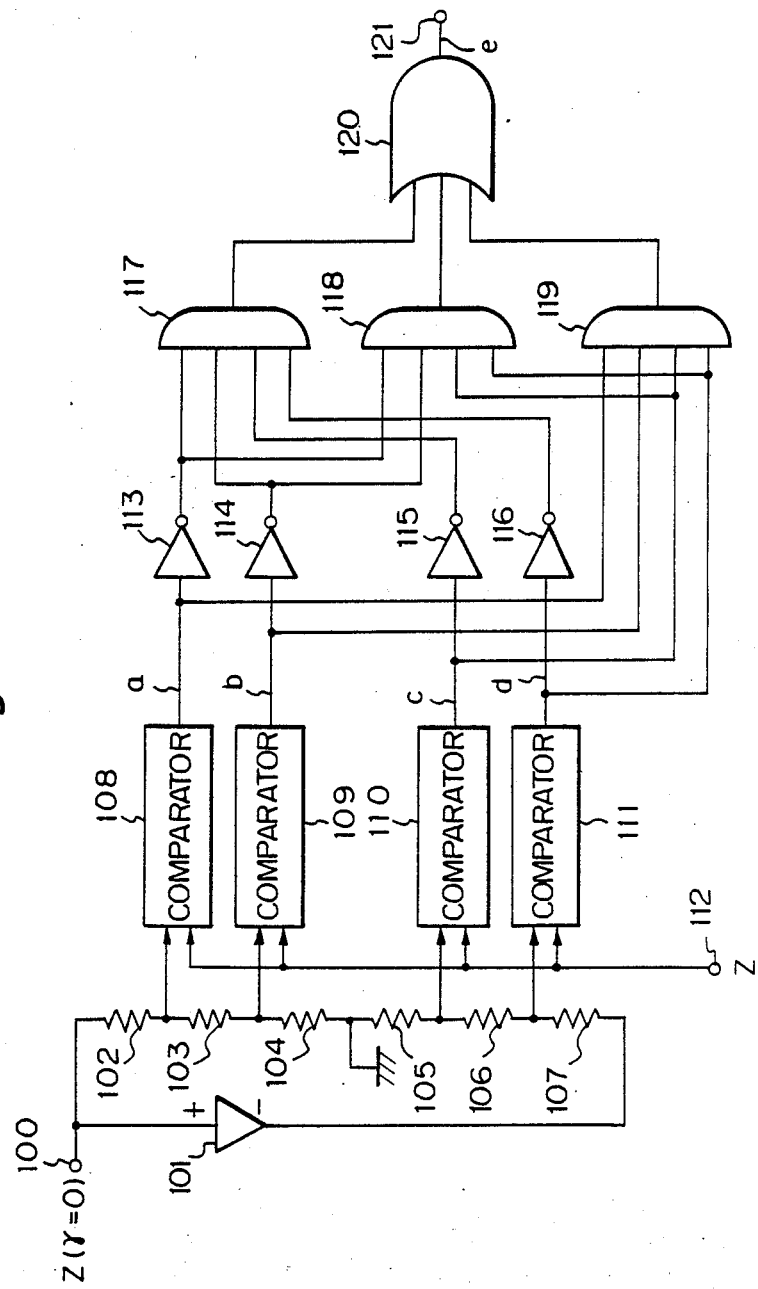
FIG. 3 is a block diagram illustrating the arrangement of a polarity signal generator 38.

FIG. 3 illustrates the arrangement of the polarity signal generator 38. In the figure, designated at 100 is an input terminal for the output from the subtracter 31; element 101 is an inverting amplifier with a gain of 1; elements 102, 103, 104, 105, 106 and 107 are resistors; elements 108, 109, 110 and 111 are comparators, each outputting a logic 1 when input voltage from the input terminal 112 is higher than voltage across the respective resistors 102 to 107 while outputting a logic 0 in the opposite case; element 112 is an input terminal for the output from the subtracter 34; elements 113, 114, 115 and 116 are NOT (logic inverter) circuits; elements 117, 118 and 119 are AND circuits; element 120 is an OR circuit, and element 121 is an output terminal. Table 1 of FIG. 10 is a truth table when the outputs from the comparators 108, 109, 110 and 111 are a, b, c and d, and the output from the OR circuit 120 is e. Assuming here that the amplitude Z of the output from the subtracter 34 inputted to the input terminal 112 changes from a negative low level ($|\lambda| = 180°$) to a positive high level ($\lambda=0$), each output changes in the order of 1, 2, 3, 4, and 5 listed in Table 1. A relationship between the output e and the phase difference $\lambda$ is therefore as illustrated in FIG. 5.

Figure 5:
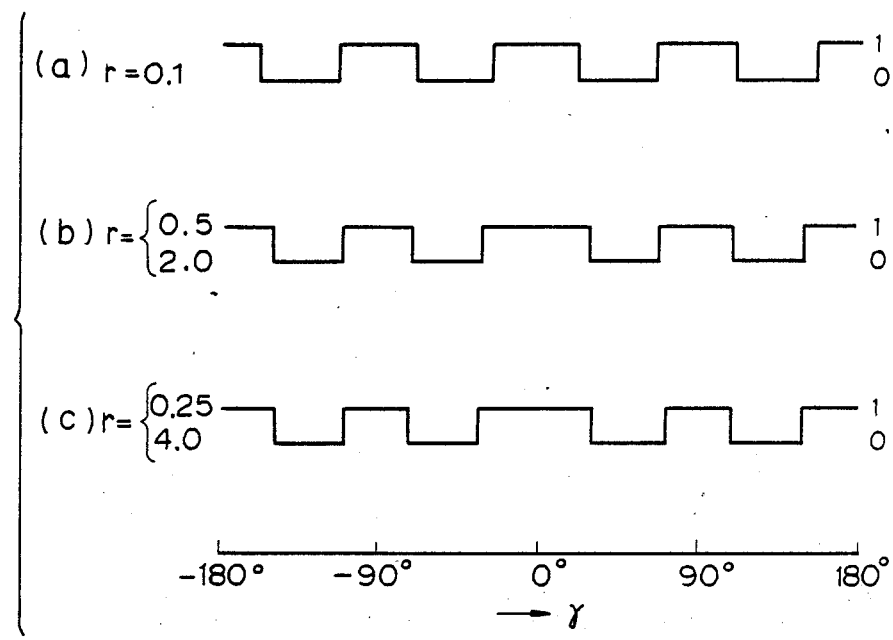
FIG. 5 is a view illustrating the output characteristics of the polarity signal generator 38 of FIG. 1.

FIG. 5 illustrates a relationship between the output e and the phase difference $\lambda$ with respect to the different amplitude ratior estimated by setting the phase retardations of the resistors 102, 103, 104, 105, 106 and 107 to 0.075, 0.269, 0.156, 0.156, 0.269 and 0.075 and referring to the characteristics of $Z-|\lambda|$ shown in FIG. 2(b). As illustrated in FIG. 5, the output e is reversed at each substantially equal interval between the adjacent phase differences $\lambda$. The mean level elimination circuit 43 is to remove a mean fraction (i.e.-the DC component) included in the reflected signal from the sea surface, the arrangement thereof being as illustrated in FIG. 9.

In FIG. 9, designated at 300 is an input terminal for the output from the adder 37; element 301 is a delay circuit having the same delay time as that of the filter 302; element 302 is a filter for eliminating longer, in time, signals than a target signal; element 303 is a subtracter for subtracting the output from the filter 302 from the output from the delay circuit 301, and element 304 is an output terminal, an output from which is fed to the polarity conversion circuit 39. The delay circuit 44 having the same delay time as that of the mean level elimination circuit 43 serves to time an output from the polarity signal generator 38 with that from the mean level elimination circuit 43.

Figure 4:
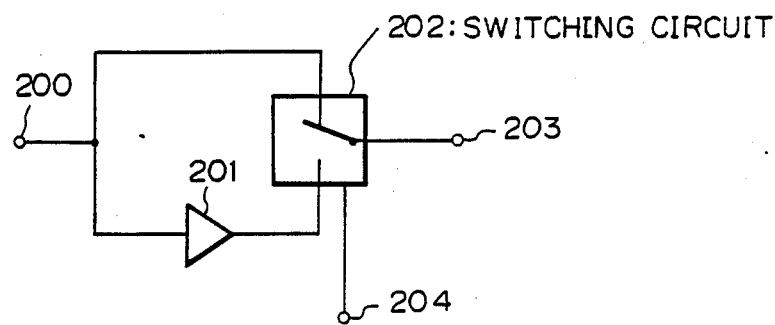
FIG. 4 is a block diagram illustrating the arrangement of a polarity conversion circuit 39 of FIG. 1.

The polarity conversion circuit 39 is arranged as illustrated in FIG. 4. In the figure, designated at 200 is an output terminal for the output from the mean level elimination circuit 43; element 201 is an inverting amplifier of a gain of 1; element 202 is a switch circuit, which is operated to be connected to the opposite side when a signal at an input terminal 204 is 0; element 204 is an input terminal for the output from the delay circuit 44, and element 203 is an output terminal.

Figure 6:
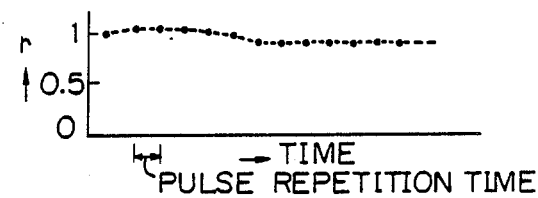
FIGS. 6(a)-6(e) are views illustrating outputs, etc., from respective portions of the equipment for explaining the output from the radar of FIG. 1.
Figure 6:
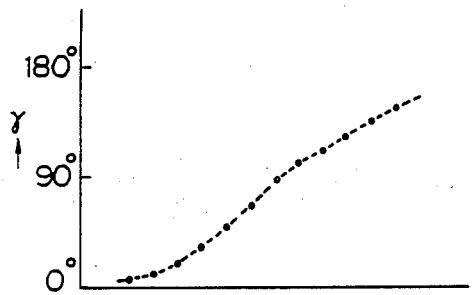
Figure 6:
Figure 6:
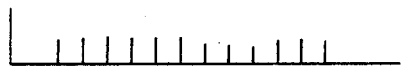
Figure 6:
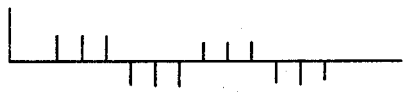

Here, an output from the polarity conversion circuit 39 will be considered for illustration of the reflected signal from the sea surface, taking as an example a signal reflected from the sea surface when the amplitude ratio r and the phase difference $\lambda$ both at each pulse repetition period are changed as illustrated as FIGS. 6(a) and 6(b). As described previously, the amplitude Y of the output from the adder 37 remains substantially constant with respect to the phase difference $\lambda$, and a change in the same at each pulse repetition is reduced as illustrated for example in FIG. 6(c) because of a slow temporal (i.e.-time varying) change in the reflected signal from the sea surface. The output from the mean level elimination circuit 43, which is obtained by removing a mean fraction from the above output from the adder 37, is also reduced in the amplitude change, as illustrated for example in FIG. 6(d). The polarity of the output may be changed oppositely to that shown in FIG. 6(d) depending upon the magnitude of the mean fraction, but may be often unchanged within the hits of pulses from the radar because of the slow temporal change of the reflected signal from the sea surface as described above. Since $\lambda \approx 1$ in the present embodiment as evidenced from FIG. 6(a), the output characteristics of the polarity signal generator 38 is as illustrated in waveform (a) of FIG. 5, and hence the output from the polarity conversion circuit 39 is as illustrated in FIG. 6(e) from the viewpoint of the above output characteristics and the phase difference of FIG. 6(b). That is, the polarity conversion circuit 39 outputs a reverse polarity signal for each small signal group. The bipolar signal is fed to the integrator 40 and added to n signals at each pulse repetition, but when those n signals include bipolar signals, they cancel each other to cause the amplitude of the output from the integrator 40 to be reduced. That is, the signal reflected from the sea surface is suppressed. Although bipolar signals appear at the output of the integrator 40, they are fed to the absolute value circuit 41, by which they are converted to predetermined unipolar signals and delivered to the output terminal.

Assuming that the number of signals of the same polarity in the $N_1$ th signal group is m (m=3 in FIG. 6(e)) in the output from the polarity conversion circuit 39 for the reflected signal from the sea surface as illustrated in FIG. 6(e), the addition of the n signals in the integrator 40 causes, since the changes in the amplitudes themselves of the signals are small as in the previous description, adjacent small signal groups to cancel each other when n>m. Hereby, only one, at most, small signal group contributes to the output of the integrator 40 to assure the voltage of mV at the highest as the amplitude of the above output. On the other hand, in case of a general target such as a vessel, a reflecting surface for radar radiowaves is structured as a solid. There is accordingly substantially no relative change found in the horizontally and vertically polarized waves of the reflected signal in the order of irradiation time of a radar beam. Thus, the amplitude ratio r and the phase difference λ are substantially unchanged during the hits of radar pulses, and also the output from the polarity conversion circuit 39 is substantially constant in its amplitude and polarity. The output amplitude of the integrator 40 is thus n Vs. Here, Vs is the target output amplitude of the polarity conversion circuit 39. As a result, the ratio of the target signal to the signal yielded by removing the mean fraction from the reflected signal from the sea surface, i.e., the ratio of target signal to varying clutter voltage (hereinafter referred to as a ratio S/C) substantially exceeds $$\frac{n}{m} \cdot \frac{Vs}{Vc}.$$

It is hereby found that the improved ratio S/C by the integration in the video signal region is substantially above n/m proportional to the first power of the number of additions of the signal. That is, in the present invention, the improved ratio S/C is proportional to the first power of the number of additions, so that an increase of the addition number n assures a more effective improvement of the ratio S/C than in the prior method where the number of frequencies used is increased.

Additionally, when the interval between the adjacent phase differences λ, for which the output from the polarity signal generator 38 has the same polarity, is reduced by for example increasing the number of the comparators in the polarity signal generator 38, the aforementioned number m of signals may be reduced so as to further improve the ratio S/C.

Furthermore, as to the amplitude Y of the adder 37, $Y \sim 2E_1$ holds from the previous expression when $E_1 > E_2$, while $Y \sim 2E_2$ holds when $E_1 >> E_2$. In other words, for the amplitude Y, the above output from the adder 37 corresponding to one component having smaller amplitude between the horizontally and vertically polarized components of the reflected radiowaves is assured. Reflected radiowaves from the sea surface are frequently different in the amplitudes of both polarized waves thereof from each other so that the amplitude Y is reduced responsively to the amplitude ratio of both polarized waves, while reflected RF waves from a general target sees no great difference between the amplitudes of both polarized waves so that the amplitude Y is not reduced in particular. Thus, also from the viewpoint of the amplitude Y, the signal to clutter voltage ratio may be improved for the reflected signal from the sea surface.

Here, approximate values of the rate of a change in the phase difference between the horizontally and vertically polarized components of the reflected RF waves from the sea surface and of the improved ratio S/C will be described in a concrete manner. The power spectral densities of both polarized waves are respectively expressed as follows using a Gaussian distribution approximation:

$$W_H(f) = W_{HO} e^{-(f-f_H)^2/2\sigma_H^2}$$

$$W_V(f) = W_{VO} e^{-(f-f_V)^2/2\sigma_V^2}$$

where f is frequency, $W_H(f)$ and $W_V(f)$ are power spectral densities of horizontally and vertically polarized radiowaves, $W_{HO}$ and $W_{VO}$ are power spectral densities of the horizontally and vertically polarized radiowaves at the center of the spectrum, $f_H$ and $f_V$ are center frequencies of the spectrum of the horizontally and vertically polarized radiowaves, and $\sigma_H$ and $\sigma_V$ are spreadings of the spectrum (standard deviation) of the horizontally and vertically polarized radiowaves. The effective value $\Delta f_{rms}$ of a difference frequency of both polarized radiowaves is, since there is no correlation between the spectrums of both polarized radiowaves, expressed as follows:

$$\Delta f_{rmf}^2 = \frac{\int_{-\infty}^{\infty}\int_{-\infty}^{\infty}(f-f')^2 W_H(f) W_V(f') df df'}{\int_{-\infty}^{\infty}\int_{-\infty}^{\infty} W_H(f) W_V(f') df df'}$$

Substitution of this expression into $W_H(f)$ and $W_V(f)$ provides $$\Delta f_{rms} = \sqrt{\sigma_H^2 + \sigma_V^2 + (f_H - f_V)^2}$$

On the assumption that $f_H = f_V$ because $f_H \sim f_V$ in case of actual RF waves reflected from the sea surface, and that $\sigma_H$ and $\sigma_V$, although sometimes satisfy $\sigma_H \neq \sigma_V$, satisfy $\sigma_H = \sigma_V = \sigma_C$ for brevity, $$\Delta f_{rms} = \sqrt{2}\,\sigma_c$$

holds.

$\sigma_c$, although being different depending upon the wavelength of the radar RF waves used and the degree of waves, satisfies $\sigma_c \lambda = 100$ to 220 cm/sec when wind velocity ranges from 8 to 20 knots (λ: wavelength of the radar RF waves) as shown in references (for example, Borton: "Radar System Analysis", P. 100, 1976, Artech House Inc.). Assumed accordingly that $\sigma_c \lambda = 160$ cm/sec, $\lambda=2.2$ cm (at frequency of 13.8 GHz, an example of harbor radars in Japan), $$\Delta f rms = 2 \times 72.7 \text{ Hz} \neq 103 \text{ Hz}$$

holds.

Assumed further the effective value of a change in a phase difference between both polarized waves during pulse repetitions is to be $\Delta\lambda rms$, $$\Delta\lambda rms = 2\omega \times \Delta f rms \times T$$

holds. Here, T is a period of the pulsed RF waves. With $T=0.33$ ms, $$\Delta\lambda rms = 2\omega \times 103 \times 0.33 \times 10^{-3} = 0.214_{rad} = 12.3°.$$

That is, the many change in the phase difference between both polarized radiowaves at each pulse repetition is 12.3°. When the output characteristics of the polarity signal generator 38 are as illustrated in FIG. 5, the mean phase angle with the same polarity is 45°, and hence the mean value of the number m of the foregoing signals is given as $m \approx 45°/12.3° = 3.7$. Assuming the number n of additions of the foregoing signals to be 12, the improved ratio S/C by the integration exceeds about $n/m \approx 12/3.7 = 3.2$ (10 dB) on the average.

Figure 7A:
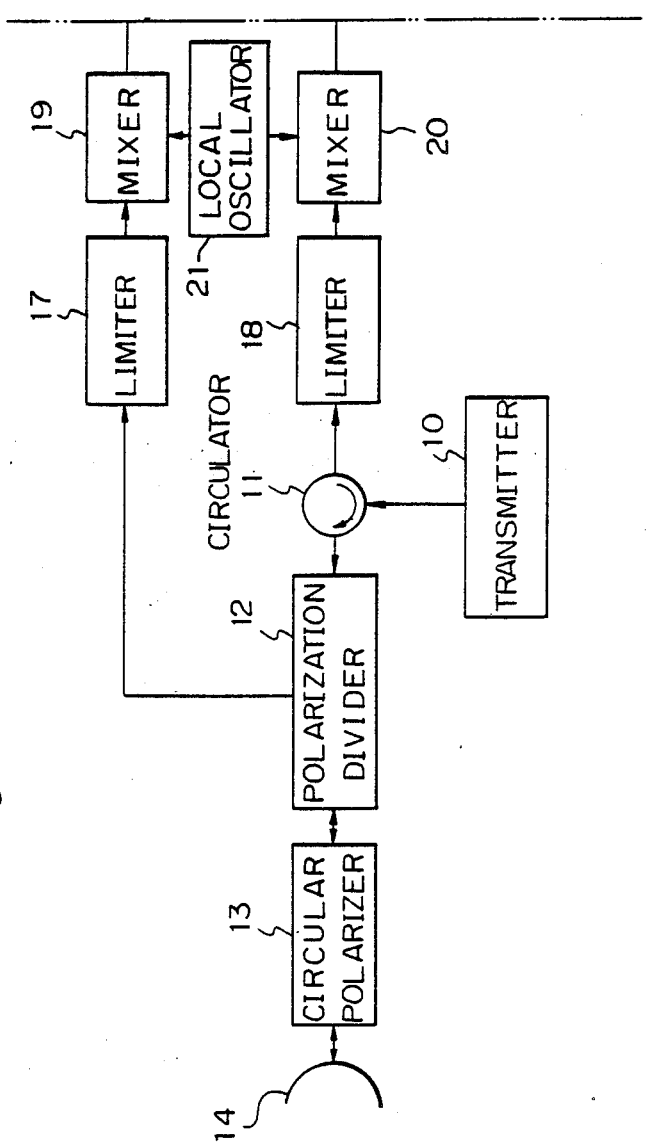
FIG. 7 consisting of FIGS. 7(a) and 7(b), is a block diagram illustrating another embodiment of the present invention.
Figure 7B:
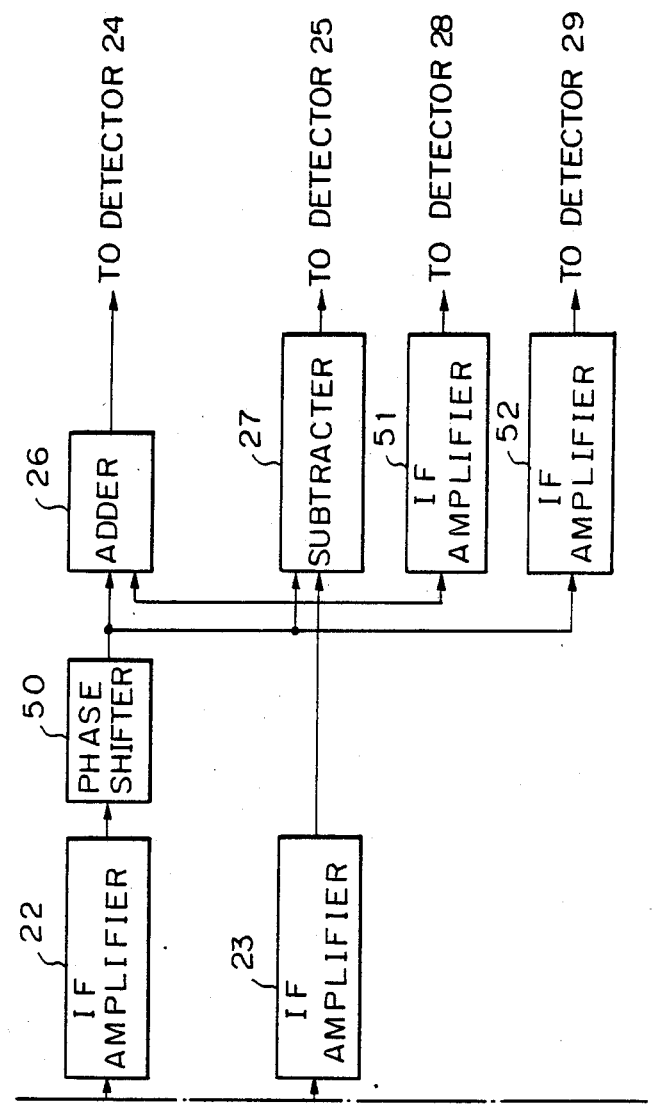

FIGS. 7(a)–7(b) illustrate another embodiment of the present invention wherein different portions from those shown in FIG. 1 are shown. In the figure, designated at 50 is a 90° phase shifter for the IF signal, and elements 51 and 52 are IF amplifiers each for amplifying the voltage of the IF signal by a factor of 2. The polarization divider 12, after receiving a signal, outputs the two polarized components $F_V$ and $F_H$ as in the embodiment of FIG. 1. These signals are, after passage through mixers 17 and 18, converted to IF signals by mixers 19 and 20, and amplified by IF amplifiers 22 and 23. The IF amplifier 22 outputs $$\frac{1}{2} e^{j\frac{\omega}{2}} (\dot{E}_1 - \dot{E}_2)$$

as an IF signal corresponding to $$\dot{F}_V = \frac{1}{2} e^{j\frac{\omega}{2}} [\sqrt{2} \, e^{-j\frac{\omega}{4}} E_H e^{j\phi_H} - \sqrt{2} \, e^{-j\frac{\omega}{4}} E_V e^{j(\phi + \frac{\omega}{2})}]$$

and hence the phase shifter 50 outputs m IF signal $$\frac{1}{2}(\dot{E}_1 - \dot{E}_2).$$

While, the IF amplifier 23 outputs $$\frac{1}{2}(\dot{E}_1 + \dot{E}_2)$$

as a signal corresponding to $$\dot{F}_H = \frac{1}{2} [\sqrt{2} \, e^{-j\frac{\omega}{4}} E_H e^{j\phi_H} + \sqrt{2} \, e^{-j\frac{\omega}{4}} E_V e^{j(\phi_V + \frac{\omega}{2})}]$$

$\dot{E}_1$ and $\dot{E}_2$ are here the same as those described before. Thus, $\dot{E}_1$, $\dot{E}_2$, $\dot{E}_1+\dot{E}_2$, and $\dot{E}_1-\dot{E}_2$, appear as IF signals at output terminals of an adder 26, a subtracter 27, an IF amplifier 51, and an IF amplifier 52, respectively. Those IF signals are the same as the IF signals inputted to the detectors 24, 25, 28, and 29 of the embodiment of FIG. 1, and hence the operation of the present embodiment is the same as in the embodiment of FIG. 1.

FIG. 8 illustrates a further another embodiment of the present invention wherein different portions from those illustrated in FIG. 1 are shown. In the figure, designated at 61 is a divider; elements 62 and 63 are circulators, and elements 64 and 65 are antennas, one for sending horizontally and vertically polarized radiowaves, the other for receiving the same. Pulsed RF waves generated by a transmitter 10 of FIG. 8 are divided into two waves by the divider 61, which are then transmitted to the circulators 62 and 63 and sent through the antennas as horizontally and vertically polarized radiowaves, respectively. A horizontally polarized component between reflected RF waves from a target is received by the antenna 64 while a vertically polarized RF wave is received by the antenna 65, both components being then transmitted to the circulators 62 and 63. Horizontally and vertically polarized components of the received RF waves transmitted from the circulators 62 and 63 are fed to the limiters 17 and 18. Operation thereafter is the same as in the embodiment of FIG. 1. Assuming here the amplitudes and phases of the horizontally and vertically polarized components of the received RF waves in the embodiment of FIG. 8 to be expressed by $E_H$ and $E_V$, and $\phi_H$ and $\phi_V$, respectively, outputs from the IF amplifiers 22 and 23 are expressed by $\dot{E}_1 = E_1 e^{j\phi_H}$ and $\dot{E}_2 = E_2 e^{j\phi_V}$. With the assumption of the phase difference being expressed by $\lambda = \phi_V - \phi_H$, the foregoing expressions can accordingly be employed as they are without alteration, followed by the same effect as in the previous embodiments.

The embodiment of FIG. 1 may be modified such that the subtractors 35 and 36 are removed and the outputs from the detectors 28 and 29 are directly connected to the adder 37. But, the previous feature, in which for the amplitude of the output from the adder 37 that corresponding to one component having a smaller amplitude between both polarized components of the reflected radiowaves is assured differing from the amplitude Y described previously, is thereupon missed.

Additionally, the embodiment of FIG. 1 may be modified such that the mean level elimination circuit 43 and the delay circuit 44 are removed, and the outputs from the adder 37 and polarity signal generator 38 are directly fed to the polarity conversion circuit 39. But, the mean fraction included in the output from the adder 37 thereupon remains as it is, so that the amplitude of the output from the polarity conversion circuit 39 for a reflected signal from the sea surface is slightly increased. The embodiment of FIG. 1 may further be modified such that an A/D converter is inserted after the detectors 24, 25, 28 and 29 of FIG. 1, and outputs from the respective detectors are converted to digital signals to process all operation after that of FIG. 1 in a digital form.

Although the invention has been described in its preferred form with a certain degree of particularity, it is to be understood that many variations and changes are possible in the invention without departing from the scope thereof.

What is claimed is:

1. Sea clutter suppression radar comprising:
    (a) at least one antenna for simultaneously sending horizontally and vertically polarized RF waves;
    (b) first and second detectors for respectively detecting IF signals of horizontally and vertically polarized components of reflected RF waves and for providing outputs corresponding thereto;

(c) third and fourth detectors for respectively detecting IF signals of the vector sum and vector difference between said horizontally and vertically polarized components and for providing outputs corresponding thereto;

(d) a first subtracter for subtracting an absolute value of a difference between said outputs from said first and second detectors, from a sum of said outputs from said first and second detectors;

(e) a second subtracter for subtracting said output from said fourth detector, from said output from said third detector;

(f) a polarity signal generator for generating an output which is a binary signal according to a selected logic combination of results of a plurality of comparisons between: (1) each of a plurality of voltages proportional to a fraction of said output of said first subtracter and a plurality of voltages proportional to a fraction of an inverted output of said first subtracter and: (2) said output from said second subtracter;

(g) a first means for providing an output equal to an absolute value of a difference between said outputs of said first and second detectors;

(h) a third subtracter for providing an output equal to a difference between said output of said first means and said output of said third detector;

(i) a fourth subtracter for providing an output equal to a difference between said output of said first means and said output of said fourth detector;

(j) an adder for adding said outputs of said third and fourth subtracters; and (k) a polarity conversion circuit for selectively converting a polarity of an output from said adder in accordance with said output from said polarity signal generator.

2. Sea clutter suppression radar comprising:

(a) at least one antenna for simultaneously sending horizontally and vertically polarized RF waves;

(b) first and second detectors for respectively detecting IF signals of horizontally and vertically polarized components of reflected RF waves;

(c) third and fourth detectors for respectively detecting IF signals of the vector sum nd vector difference between said horizontally and vertically polarized components;

(d) a first subtracter for subtracting an absolute value of a difference between said outputs from said first and second detectors, from a sum of said outputs from said first and second detectors;

(e) a second subtracter for subtracting said output from said fourth detector, from said output from said third detector;

(f) a polarity signal generator for generating an output which is a binary signal according to a selected logic combination of results of a plurality of comparisons between: (1) each of a plurality of voltages proportional to a fraction of said output of said first subtracter and a plurality of voltages proportional to a fraction of an inverted output of said first subtracter and: (2) said output from said second subtracter;

(g) a first means for providing an output equal to an absolute value of a difference between said outputs of said first and second detectors;

(h) a third subtracter for providing an output equal to a difference between said output of said first means and said output of said third detector;

(i) a fourth subtracter for providing an output equal to a difference between said output of said first means and said output of said fourth detector;

(j) an adder for adding said outputs of said third and fourth subtracters;

(k) a mean level elimination circuit for subtracting a DC value from said output of said adder; and (l) a polarity conversion circuit for selectively converting a polarity of an output of said mean level elimination circuit in accordance with said output from said polarity signal generator.

3. A sea clutter suppression radar according to claim 2, wherein said mean level elimination circuit includes delay circuits, filter and subtracters.

4. A sea clutter suppression radar according to claim 2, wherein said polarity conversion circuit includes switching circuits.

* * * * *